Patented May 4, 1937

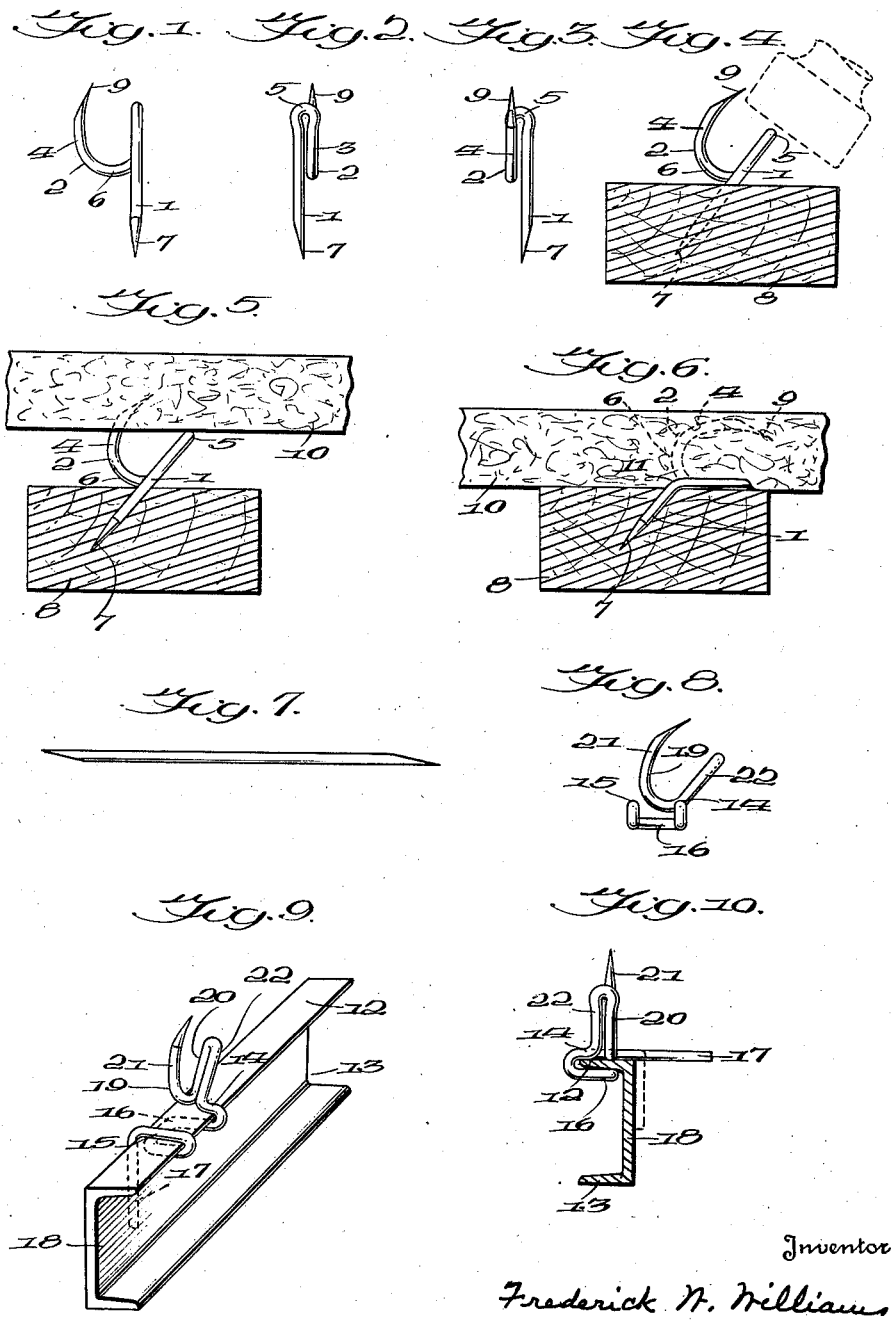

2,079,194

UNITED STATES PATENT OFFICE 2,079,194

FASTENING DEVICE

Frederick W. Williams, Honolulu, Territory of Hawaii

Application July 3, 1936, Serial No. 88,869

10 Claims. (Cl. 72—118)

My invention relates to fastening devices for securing or attaching fibrous or cork wall boards, tiles and the like to suitable supports.

The principal object of the invention is to provide a fastener of simple construction which will invisibly and effectively connect fibrous and cork wall boards and the like to any convenient support, such, for example, as joists, studs, wooden furring and metal framing.

A primary feature of the invention consists in providing the fastener with a prong adapted to penetrate the wall board and with means movable by the board to cause the prong during penetration thereof to assume different angular positions with respect to the inner face of the board.

Another feature of the invention consists in providing the fastener with a prong adapted to penetrate the board and with means movable by the board during penetration thereof by the prong for causing the leading end of the latter to move in a curvilinear direction within the board.

A further feature of the invention resides in providing the fastener with a substantially U-shaped portion, one leg of which constitutes a prong for penetrating the board, the U portion being rotatable by the board during penetration thereof by the prong to change the angular position of the latter with respect to the inner face of the board.

A still further feature of the invention consists in providing the fastener with a stem portion for connection to a support and with a prong for penetrating the board, the stem being bendable by the board during penetration thereof by the prong for causing the latter as it penetrates to change its angular position with respect to the inner face of the board.

Other and more specific features of the invention residing in advantageous forms, combinations and relations of parts will hereinafter appear and be pointed out in the claims.

In the drawing,

Figure 1 is a side elevational view of the fastener.

Figure 2 is an end view of the fastener as viewed from the right hand side of Figure 1.

Figure 3 is an end view of the fastener as viewed from the left hand side of Figure 1.

Figure 4 is a sectional view of a support showing the preferred manner of connecting the fastener thereto.

Figure 5 is a view showing the fastener connected to the support and a wall board partially connected with the fastener.

Figure 6 is a view partly in section and partly in elevation, illustrating the wall board fully attached to the support by the fastener.

Figure 7 is an elevational view, illustrating a single piece of wire from which the fastener may be formed.

Figure 8 is a side view of a modified form of the fastener adaptable for securing a wall board to metal framing.

Figure 9 is a perspective view showing the manner in which the fastener illustrated in Figure 8 may be secured to metal framing.

Figure 10 is a view partly in elevation and partly in section showing the fastener partly connected to a metal frame.

Referring more particularly to the drawing, the fastener illustrated in Figures 1 to 6, inclusive, comprises generally a nail-like stem 1 and a substantially U-shaped portion 2 having legs 3 and 4, respectively. The fastener may be advantageously formed from a single piece of wire, such as shown in Figure 7, which is provided with the desired configuration by being reversely bent as indicated at 5 and 6, respectively. The axes of the two bends are, for a purpose which will clearly appear, disposed at substantially right angles and the bend at 5 is preferably very abrupt so that leg 3 of the U extends parallel with and closely adjacent the stem.

The stem is pointed, as indicated at 7, so that it may be easily driven by any suitable tool, such as a hammer (the head of which is shown in dotted lines in Figure 4) into a penetrable support 8. The outer end of leg 4 is also pointed as indicated at 9 and it constitutes a prong adapted to penetrate a wall board, tile or the like 10 which is to be connected to the support.

In using the fastener, the stem 1 is first driven, in the manner of a nail, into the support at an acute angle to the plane which is to be occupied by the inner face of the wall board after the board is connected to the support, the stem preferably being driven far enough to cause the bend of the U 2 to engage the outer face of the support.

When the fastener is thus connected to the support, the outer end of the prong 4 projects a greater distance in advance of the support than the portion 5 of the fastener which is common to the stem and the leg 3. The board or tile 10 may, therefore, be forced upon the prong at the desired point with a minimum of effort until the inner face of the board or tile contacts the portion 5 of the fastener at which time, on account of the inclination of the stem 1 with respect to the inner face of the board, continued inward movement of the board will cause the stem to bend at 11 and force inwardly toward the support the portion of the stem between the outer end thereof and the bend 11, together with the leg 3 of the U, until it occupies a position parallel with the inner face of the board. As this projecting portion of the stem is being bent inwardly, the U portion of the fastener is being caused to rotate, thus moving the leading or pointed end 9 of the prong in a curvilinear direction within the board. By causing the prong to move in this manner as the wall board is forced toward the support, it will be perceived, as by reference to Figure 6, that the prong is caused to assume a position such that the wall board is firmly attached to the support. Although a greater force is necessary to bend the stem than to cause the prong to first penetrate the board, the force required to accomplish this may be easily obtained by hammering on a suitable abutment (not shown) placed on the front face of the board to prevent it from being marred or disfigured.

Although it has been found advantageous to drive the stem of the fastener into the support at an angle of approximately 45° to the inner face of the board, it will be obvious that the stem may be placed in the support at any angle such that it can be bent inwardly by the board when the latter is forced into position. If, however, the stem is placed in the support at an angle of only slightly less than 90° to the inner face of the board, the portion 5 of the fastener will tend to cut into the rear face of the board and if the stem is disposed at such an acute angle as to be substantially parallel with the inner face of the board not only will the fastener be insecurely connected to the support but the prong will not be moved sufficiently to effect a firm connection with the board.

The prong is so formed or is of such length that having regard for the angle at which the stem is to be disposed, the outer or pointed end of the prong will, when the fastener is connected to the support, be disposed in a line perpendicular to the inner face of the board which passes through the portion of the stem 11 where it will be bent by the board. By arranging the prong in this manner, the wall board or tile 10, although it will first move laterally in one direction and then in the other as it is being forced toward the support onto the prong, will assume the same relative position with respect to the support when it is fully connected thereto as when it is initially penetrated by the extreme outer end of the prong. Thus, except for the change of position of the board occasioned by moving it toward the support, the board will occupy the same relative position with respect to the support at the time it is first penetrated by the prong as when it is fully connected to the support, that is to say, the board when fully connected to the support occupies the same position with respect to the latter as it would have had it been moved toward the support in a line normal to the inner face of the board instead of being moved, as it is caused to do by the prong, laterally in one direction and then laterally in the opposite direction.

In Figures 8 to 10, inclusive, of the drawing, there is illustrated a fastener of the same general construction as the fastener previously described, except that it is primarily adapted for connecting wall boards, tiles or the like to metal framing and, for this purpose, the portion of the fastener corresponding to the lower end of the stem 1 is suitably bent to clip over an adjacent portion of a metal frame, such as a flange 12 of a channel beam 13. While the portion of the fastener to be connected to the channel may be bent into any desired configuration capable of effectively securing the fastener thereto, it is preferably formed, as clearly shown in Figure 9, to provide laterally spaced portions 14 and 15 overlapping the outer face of the flange 12, which are connected by a U-shaped portion 16 overlapping the opposite face of the flange. The portion 15 of the fastener has a prolongation 17 which, after the fastener has been assembled with the channel, is adapted to be bent rearwardly into overlapping engagement with the web 18 of the channel, whereby the fastener is securely fixed to the beam.

The portion of the fastener illustrated in Figures 8 to 10, inclusive, cooperable with the wall board or tile is of the same construction as the corresponding portion of the fastener illustrated in Figures 1 to 6, inclusive, being provided with a U-shaped portion 19 having legs 20 and 21, the latter one of which constitutes a prong, and a portion 22 similar to that portion of stem 1 of the fastener illustrated in Figures 1 to 6, inclusive, between the bend 11 and the outer end 5. When the U portion 19 is caused to rotate by the wall board being forced inwardly toward the metal frame or beam, the portion 14 of the fastener is caused to twist in the same manner the stem 1 is bent at 11.

It will be apparent that fasteners embodying the present invention enable wall boards, tiles and the like to be easily and most effectively secured to any suitable support, can be manufactured at very low cost and are of such shape as to be conveniently packaged. Moreover, as they do not penetrate the outer surface of the wall boards, the fasteners may be used with boards having decorated outer surfaces without danger of damaging such surfaces and, in view of the manner in which the prongs hook into the wall boards, there is no possibility of the latter becoming detached from the fasteners as frequently occurs when nails and the like are used with fibrous boards which become damp or wet from any cause, such as by absorbing moisture from plaster which is some times applied to the outer surface of the board.

What I claim is:

1. A fastener for connecting wall boards and the like to a support, including means for securing the fastener to the support, a prong adapted to penetrate the board at an angle to the inner face thereof, and means engageable by the board and movable thereby with respect to said securing means for causing said prong during penetration of the board to change its angular position with respect to the inner face of the board.

2. A fastener for connecting wall boards and the like to a support, including means for securing the fastener to the support, a prong adapted to penetrate the board, and means connected to the prong and movable by the board with respect to said securing means for causing the leading end of the prong as it penetrates the board to move in a curvilinear direction.

3. A blind fastener for wall boards and the like including means for securing the fastener to a support, a prong adapted to penetrate the board, and a portion formed integrally with the prong adapted to extend at an acute angle to the inner face of the board, said portion being engageable at one end with the board and being movable thereby with respect to the securing means into a position substantially parallel with said inner face for causing the prong during penetration of the board to assume different angular positions with respect to the inner face of the latter.

4. A fastener for connecting wall boards and the like to a support, including a portion cooperable with the support for securing the fastener thereto, a prong adapted to penetrate the board, and means connected to the prong engageable with the board and movable thereby for causing said prong during penetration of the board to change its position with respect to the portion of the fastener cooperable with the support.

5. A fastener for connecting wall boards and the like to a support, including a portion for securing the fastener to the support, and a substantially U-shape portion adapted to cooperate with the board, one of the legs of the U being adapted to penetrate the board at an angle to the inner face thereof and the other leg of the U being engageable at one end with the board and movable thereby for rotating said U-shape portion to cause the first named leg during penetration of the board to change its angular position with respect to the inner face of the latter.

6. A fastener for connecting wall boards and the like to a support, including a portion for securing the fastener to the support, and a prong rigid with said portion adapted to penetrate the board at an angle to its inner face, said portion being bendable by the board for causing the prong during penetration of the board to change its angular position with respect to the inner face of the latter.

7. A fastener for connecting wall boards and the like to a support, comprising a nail-like stem for securing the fastener to the support, and a substantially U-shape member including a prong adapted to penetrate the board at an angle to the inner face thereof, said U-shape member having a bendable connection with the stem being movable by the board for causing said prong during penetration of the board to change its angular position with respect to the inner face of the latter.

8. A fastener for connecting wall boards and the like to a support, including a nail-like stem for securing the fastener to the support, and a prong connected to the outer end of the stem adapted to penetrate the board at an angle to its inner face, said stem being engageable adjacent its outer end by the board and being bendable by the board during penetration thereof by the prong to change the angular position of the latter with respect to the inner face of the board.

9. A fastener formed from a single piece of wire for connecting wall boards and the like to a support, said fastener including a substantially U-shape portion one leg of which constitutes a prong adapted to penetrate the board and the other leg of which terminates in a reverse bend affording means for securing the fastener to the support, said last named leg being movable by the board with respect to said means for causing the leading end of the prong as it penetrates the board to move in a curvilinear direction.

10. A fastener for connecting wall boards and the like to a support, including a stem for securing the fastener to the support, the outer end of the stem terminating in a reversely bent portion providing a prong adapted to penetrate the board at an angle to the inner face thereof, said stem being bendable by the board during penetration thereof by the prong for causing the latter as it penetrates to change its angular position with respect to the inner face of the board.

FREDERICK W. WILLIAMS.